(12) United States Patent
Bae et al.

(10) Patent No.: US 6,643,097 B2
(45) Date of Patent: Nov. 4, 2003

(54) DISC CARTRIDGE AND DISC RECORDING AND REPRODUCING APPARATUS

(75) Inventors: Byoung-young Bae, Gyeonggi-do (KR); Soon-kyo Hong, Seoul (KR); Un-jin Choi, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 69 days.

(21) Appl. No.: 09/964,683

(22) Filed: Sep. 28, 2001

(65) Prior Publication Data

US 2002/0149880 A1 Oct. 17, 2002

(30) Foreign Application Priority Data

Apr. 16, 2001 (KR) ........................................ 2001-20174

(51) Int. Cl.[7] .............................................. G11B 23/03
(52) U.S. Cl. ........................................ 360/133; 369/291
(58) Field of Search ................................. 360/133, 128; 369/291

(56) References Cited

U.S. PATENT DOCUMENTS

| | | | | |
|---|---|---|---|---|
| 5,359,483 A | * | 10/1994 | Arsenault et al. | 360/133 |
| 5,532,893 A | * | 7/1996 | Nyberg et al. | 360/133 |
| 5,710,687 A | * | 1/1998 | Drebenstedt | 360/133 |
| 5,980,791 A | * | 11/1999 | Berscheid et al. | 360/133 |
| 6,021,027 A | * | 2/2000 | Kikuchi | 360/133 |
| 6,130,806 A | * | 10/2000 | Uwabo et al. | 360/133 |

* cited by examiner

*Primary Examiner*—Robert S. Tupper
(74) *Attorney, Agent, or Firm*—Staas & Halsey LLP

(57) ABSTRACT

A disc cartridge having a disc to record information and a case to accommodate the disc includes a cleaning unit installed inside the case and selectively contacting or being separated from the disc depending on a flow of air generated during a rotation of the disc, so that the cleaning unit removes foreign material adhering to a surface of the disc when contacting the disc. Since cleaning is automatically performed depending on the flow of air, inconvenient manual operation is not necessary. Furthermore, since the cleaning unit does not deviate from a disc area, miniaturization of the disc cartridge or disc recording and reproducing apparatus is possible.

31 Claims, 6 Drawing Sheets

DISC CARTRIDGE AND DISC RECORDING AND REPRODUCING APPARATUS

CROSS-REFERENCE TO RELATED APPLICATIONS

This application claims the benefit of Korean Application No. 2001-20174, filed Apr. 16, 2001, in the Korean Industrial Property Office, the disclosure of which is incorporated herein by reference.

BACKGROUND OF THE INVENTION

1. Field of the Invention

The present invention relates to a disc cartridge and a disc recording and reproducing apparatus, and more particularly, to a disc cartridge and a disc recording and reproducing apparatus in which foreign material adhering to the surface of a disc can be effectively removed.

2. Description of the Related Art

In general, a disc cartridge 1, as shown in FIG. 1, accommodates a disc 2 where predetermined information is stored in an optical or magnetic method. A shutter 3 capable of sliding to be selectively opened or shut is installed at one side of the disc cartridge 1 so that a head (not shown) of a disc recording and reproducing apparatus can access the disc 2 and perform recording and reproduction.

However, the disc 2 accommodated in the cartridge 1 is not normally provided with a protective layer. Thus, when foreign material such as tiny dust particles adhere to the surface of the disc 2, critical errors may be generated during recording and reproducing information to/from the disc 2. Even when the disc 2 is not accommodated in the cartridge 1 and is provided with the protective layer, foreign material adhering to the surface of the disc 2 may generate an error during recording and reproduction. In particular, in the case of the disc 2 used by being accommodated in the cartridge 1, it is highly likely that an error is generated due to foreign material adhering to the surface of the disc 2.

Thus, in order to reduce the possibility of generation of such an error, according to the conventional technology, a cleaning apparatus as shown in FIGS. 1 through 3 is installed inside the cartridge 1 to remove foreign material on the surface of the disc 2. The cleaning apparatus includes a support arm 4 rotatably installed in the cartridge 1, a cleaning member 5 installed at the support arm 4 to contact the surface of the disc 2, and a lever portion 6 protruding outside the cartridge 1 so that a user can rotate the support arm 4. Thus, during cleaning, as shown in FIGS. 1 and 3, the support arm 4 is rotated so that the cleaning member 5 is in contact with the disc 2. Then, the disc 2 is rotated to clean the foreign material adhering to the surface of the disc 2. During recording and reproduction, as shown in FIG. 2, the support arm 4 is rotated in the opposite direction so that the disc 2 does not interfere with the cleaning member 5.

In the above-described structure, it is inconvenient for a user to manipulate the lever portion 6 every time cleaning is desired. Also, since the support arm 4 and the lever portion 6 are installed outside the area of the disc 2, the cartridge 1 becomes large and it is difficult to manufacture a compact disc recording and reproducing apparatus. Thus, a structure to remove foreign material on the surface of the disc 2 in a simple and convenient method is needed.

SUMMARY OF THE INVENTION

Accordingly, it is an object of the present invention to provide a disc cartridge and a disc recording and reproducing apparatus having a simplified structure so that foreign material on the surface of a disc can be easily removed.

Additional objects and advantages of the invention will be set forth in part in the description which follows, and, in part, will be obvious from the description, or may be learned by practice of the invention.

To achieve the above and other objects, there is provided a disc cartridge including a disc which is an information recording medium, and a case to accommodate the disc, the disc cartridge comprising a cleaning unit installed inside the case and selectively contacting or being separated from the disc depending on a flow of air generated during a rotation of the disc, so that the cleaning unit removes foreign material adhering on a surface of the disc when contacting the disc.

Also, to achieve the above and other objects, there is provided a disc recording and reproducing apparatus to record or reproduce information with respect to a disc rotating inside a housing, the apparatus comprising a cleaning unit installed inside the housing and selectively contacting or being separated from the disc depending on a flow of air generated during a rotation of the disc, so that the cleaning unit removes foreign material adhering on a surface of the disc when contacting the disc.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
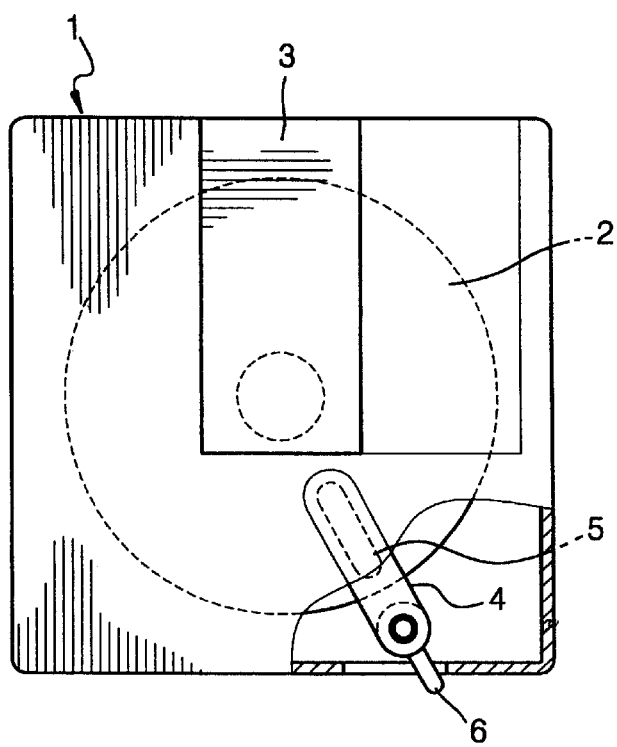
FIGS. 1 through 3 are views showing a conventional disc cartridge having an additional disc cleaning apparatus.
Figure 2:
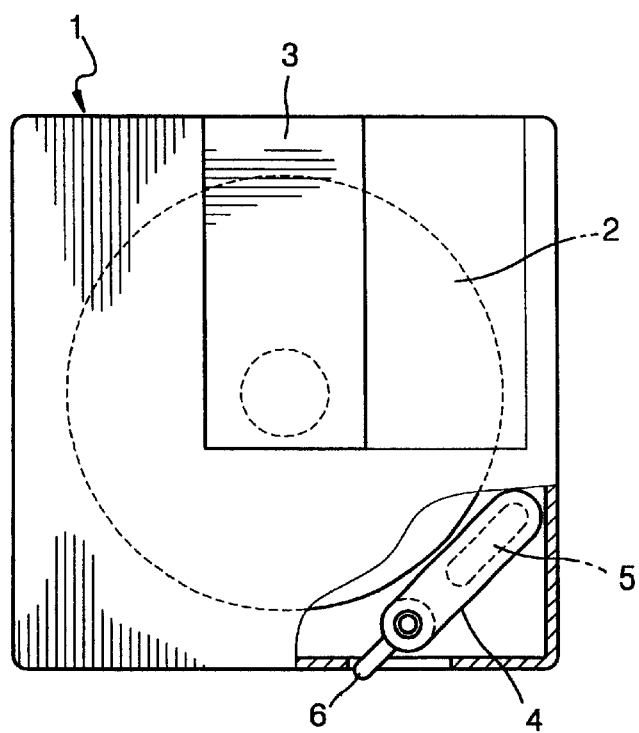
Figure 3:
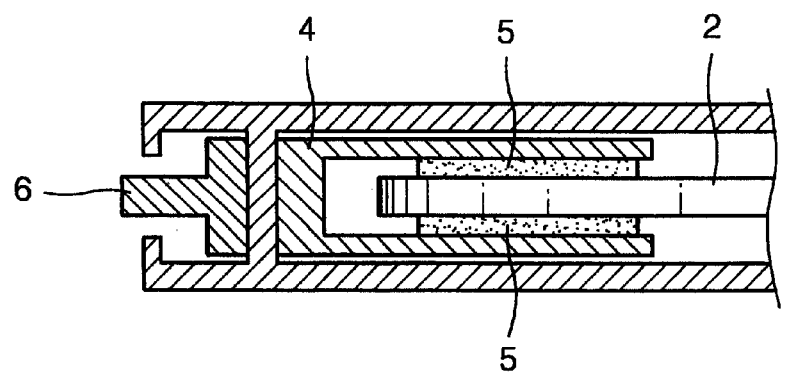
Figure 4:
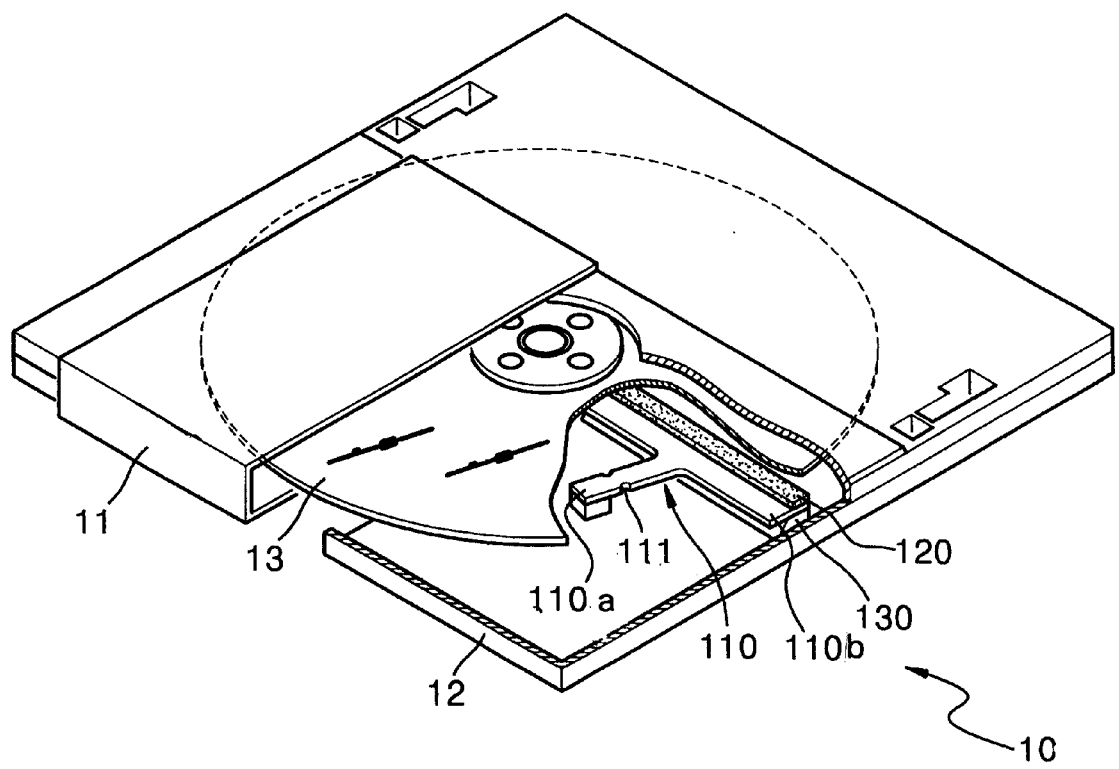
FIG. 4 is perspective view showing a disc cartridge having a cleaning unit according to a first embodiment of the present invention.
Figure 5:
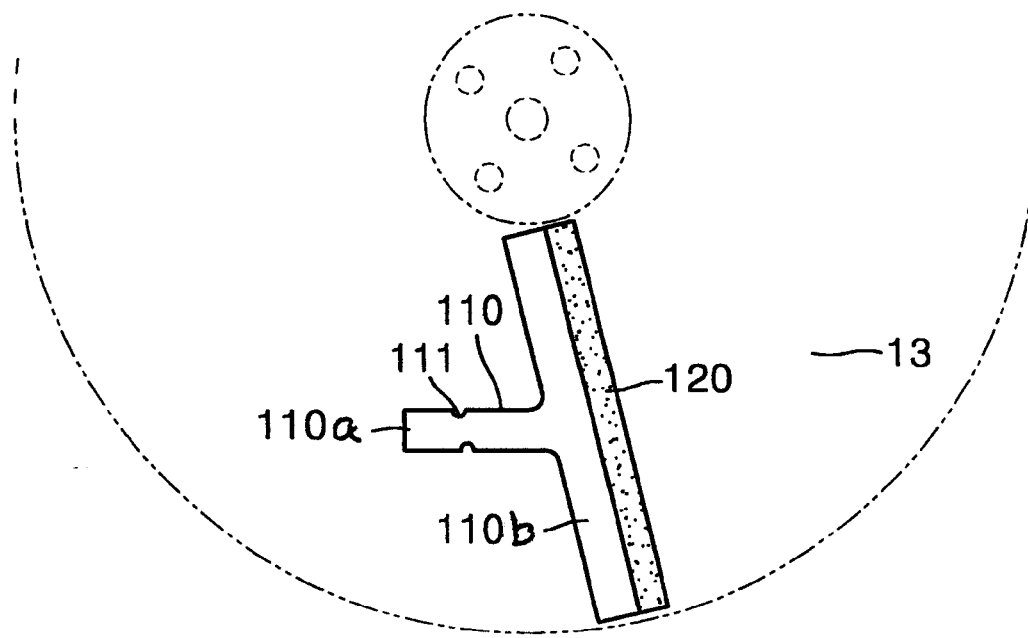
FIG. 5 is a plan view of the disc cartridge of FIG. 4.
Figure 6:
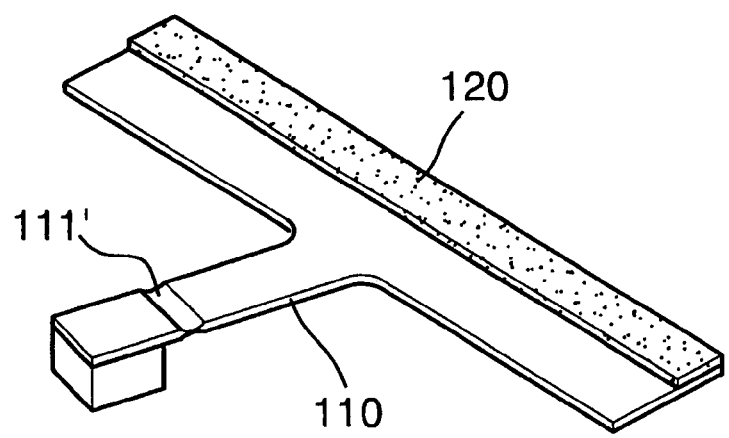
FIG. 6 is a perspective view showing a modified example of the elastic plate notch portion shown in FIG. 4.

Reference will now be made in detail to the present preferred embodiments of the present invention, examples of which are illustrated in the accompanying drawings, wherein like reference numerals refer to like elements throughout.

FIGS. 4 through 7B show a disc cartridge according to a first embodiment of the present invention. Referring to the drawings, a disc cartridge 10 of the present invention includes a case 12 to accommodate a disc 13, and a shutter 11 installed at the case 12, which is capable of being opened and shut so that a recording and reproducing apparatus can access the disc 13. An elastic plate 110 having one end portion 110*a* fixed to an inner bottom surface of the case 12, and a free end portion 110*b* elastically moving between the disc 13 and the inner bottom surface of the case 12, is installed inside the case 12. The elastic plate 110 is elastically biased in a direction in which the free end portion 110*b* is separated from the disc 13. A filter 120 to remove foreign material on the surface of the disc 13 by selectively contacting the surface according to deformation of the elastic plate 110, is installed at the free end portion 110*b*. A protrusion 130 protruding toward the free end portion 110*b* is formed on the inner bottom surface of the case 12. The protrusion 130 guides the flow of air during rotation of the disc 13 toward the rear side of the free end portion 110*b* the elastic plate 116 so that the filter 120 is pressed to be in close contact with the disc 13. Reference numeral 111 denotes a notch portion formed in the elastic plate 110 to function as a deformation point. The notch portion 111 can be formed by reducing the width of the elastic plate 110 or the thickness of the elastic plate 110 (see notch portion 111' of FIG. 6).

Figure 7A:
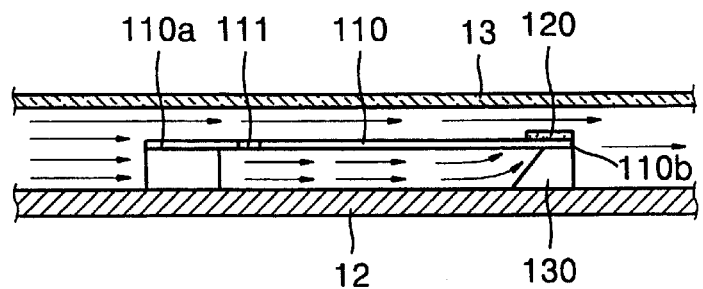
FIGS. 7A and 7B are views for explaining the operation of the cleaning unit in the disc cartridge shown in FIG. 4.

In the above structure, when the disc 13 inside the case 12 rotates at a speed to record and reproduce, the filter 120 maintains a state of being separated from the disc 13, as shown in FIG. 7A. That is, although air flows according to the rotation of the disc 13 along the protrusion 130 (as indicated by the arrows), and presses the free end portion 110*b* of the elastic plate 110 toward the disc 13, the force of air does not overcome the elastic force of the elastic plate 110.

Figure 7B:
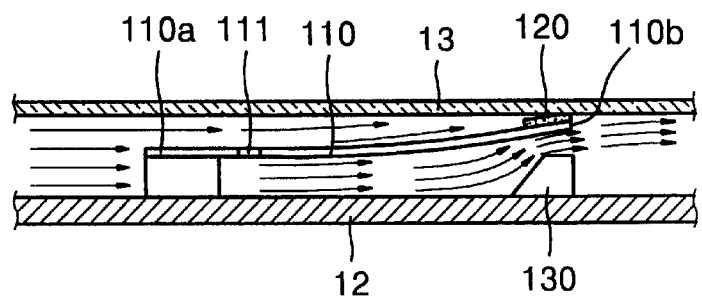

However, when the disc 13 rotates at a high speed above the recording and reproduction speed, the flow of air generated around the disc 13 moves along the protrusion 130 and strongly pushes the free end portion 110*b* of the elastic plate 110 toward the disc 13. The force pushing the elastic plate 110 overcomes the elastic force of the elastic plate 110 so that the filter 120 contacts the disc 13, as shown in FIG. 7B. Thus, as the filter 120 contacts the disc 13 rotating at a high speed, the filter 120 removes foreign material adhering to the surface of the disc 13. Then, when the rotation speed of the disc 13 decreases, the free end portion 110*b* of the elastic plate 110 returns to its original position due to a restoring force thereof. Thus, by setting a speed at which the flow of air generated enables the filter 120 to contact the disc 13 to a cleaning mode, cleaning is performed by the flow of air without additional operation by the user.

Figure 8A:
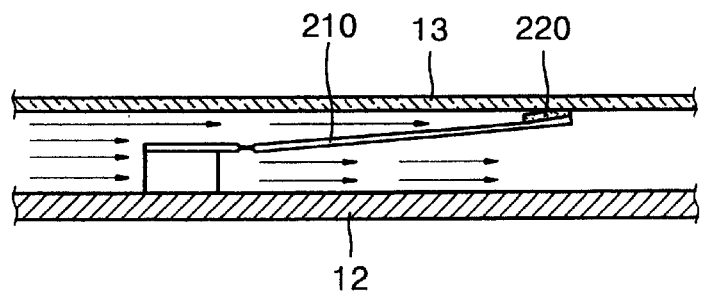
FIGS. 8A and 8B are views showing a disc cartridge having a cleaning unit according to a second embodiment of the present invention.
Figure 8B:
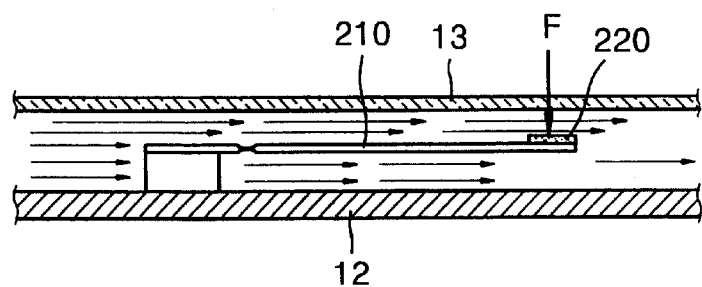

FIGS. 8A and 8B show a disc cartridge according to a second embodiment of the present invention. In this embodiment, it is a feature that the direction of elastic bias of an elastic plate 210 is opposite that of elastic plate 110. Specifically, while the elastic plate 110 is elastically biased in a direction in which the filter 120 is separated from the disc 13, the elastic plate 210 is elastically biased in a direction in which a filter 220 is in contact with the disc 13.

Thus, when the disc 13 inside the case 12 rotates at a low speed under the speed to record and reproduce the filter 220 contacts the disc 13 and performs cleaning, as shown in FIG. 8A. However, when the rotation speed of the disc 13 reaches the speed to record and reproduce the flow of air generated around the disc 13 passes between the filter 220 and the disc 13. The air generates a force F in the direction in FIG. 8B, so that the filter 220 is separated from the disc 13. Since the speed of the air around the surface of the disc 13 is relatively fast, the air pressure close to the disc 13 is relatively low, so that the filter 220 may be slightly moved toward the disc 13. Nevertheless, since a force generated by the air flowing in between the filter 220 and the disc 13 is larger than that caused by the low air pressure near the disc 13, the separated state is maintained.

Thus, in this embodiment, if the elastic force of the elastic plate 210 is set such that the filter 220 is separated from the disc 13 when the disc 13 reaches the speed for recording and reproduction, cleaning can be performed depending on the flow of air without an additional operation by a user.

Figure 9A:
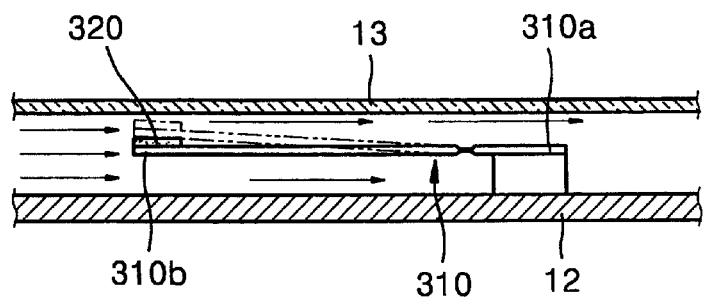
FIGS. 9A and 9B are views showing a disc cartridge having a cleaning unit according to a third embodiment of the present invention.
Figure 9B:
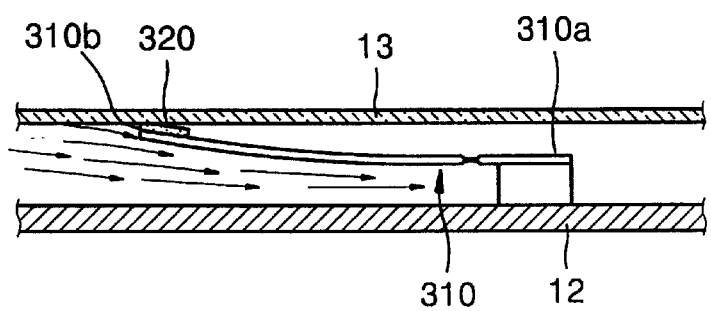

FIGS. 9A and 9B show a disc cartridge according to a third embodiment of the present invention. In this embodiment, while the direction of applying the elastic bias of an elastic plate 310 is the same as that in the first embodiment, the direction of the air flow is in the opposite direction. Specifically, a free end portion 310*b* of the elastic plate 310 is elastically biased in a direction in which a filter 320 is separated from the disc 13. When the disc 13 rotates, air comes from the free end portion 310*b* of the elastic plate 310 to an end 310*a* of the elastic plate 310 fixed to the case 12. Thus, when the disc 13 rotates at the speed to record and reproduce information, the filter 320 maintains a state of being separated from the disc 13, as shown in FIG. 9A.

However, when the disc 13 rotates beyond the speed to record and reproduce the information, the filter 320 is slightly moved toward the disc 13 (as indicated by two dot chain lines of FIG. 9A), due to the flow of air generated around the disc 13. A force generated due to the pressure difference between air close to the disc 13 and air far from the disc 13 is applied to the free end portion 310*b* so that the filter 320 moves slightly towards the disc 13.

At a high rotation speed, the filter 320 moves toward the disc 13, as shown in FIG. 9B, and the flow of air directly presses the free end portion 310*b* of the elastic plate 310 so that the filter 320 closely contacts the disc 13. Thus, the filter 320 contacting the disc 13 rotating at a high speed removes foreign material adhering to the surface of the disc 13. When the rotation speed of the disc 13 decreases, the filter 320 is separated from the disc 13 due to a restoring force of the elastic plate 310, and returns to its original position.

Therefore, by setting a mode such that the filter 320 can selectively contact or be separated from the disc 13 depending on the rotation speed of the disc 13, cleaning can be performed by the flow of air, without manual operation of a user. Although a cleaning unit is installed with respect to one surface of the disc 13 in the above embodiments, it is obvious that the same structure can be symmetrically installed with respect to both sides of the disc 13.

Use of a cleaning unit including the elastic plate and the filter to remove foreign material is not limited to the disc cartridge. For example, in the case in which the disc is not accommodated in the cartridge, as in a recording and reproducing apparatus such as a hard disk drive, the above cleaning unit may be installed inside a housing of the recording and reproducing apparatus where the disc is driven. Since the housing encompasses the disc in a similar manner to the disc cartridge, when the cleaning unit according to the above various embodiments is installed in the housing, the filter can selectively contact or be separated from the disc by the force generated by the flow of air and differences in air pressure.

Figure 10:
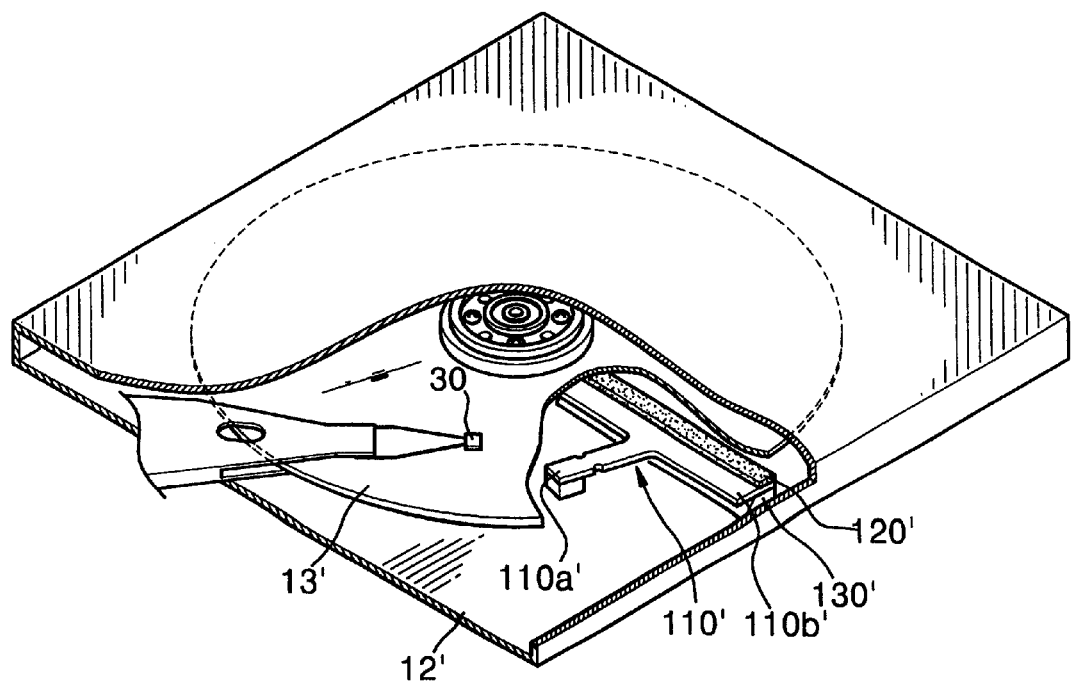
FIG. 10 is a perspective view showing a disc recording and reproducing apparatus having the cleaning unit according to the first embodiment of the present invention.

FIG. 10 shows a disc recording and reproducing apparatus adopting a cleaning unit according to an embodiment similar to the first embodiment described above. One side 110*a*' of an elastic plate 110' is fixed to an inner bottom surface of a housing 12' of the disc recording and reproducing apparatus, and a filter 120' selectively contacting a disc 13' is installed at the other side of the elastic plate 110', which is a free end portion 110*b*'. A protrusion 130' protruding toward side 110*a*' of the elastic plate 110' is formed at the inner bottom surface of the housing 12'. Reference numeral 30 denotes a magnetic head which is one of the recording and reproducing apparatuses.

Figure 11A:
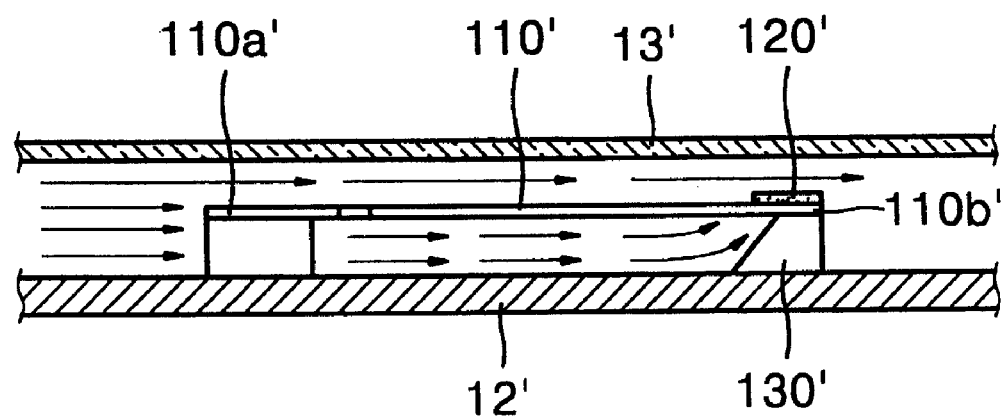
FIGS. 11A and 11B are views for explaining the operation of the cleaning unit in the disc cartridge shown in FIG. 10.

In the above structure, when the disc 13' inside the housing 12' rotates at the speed to record and reproduce information, as shown in FIG. 11A, since a force caused by the flow of air is not enough to overcome an elastic force of the elastic plate 110' and deform the elastic plate 110', the filter 120' is maintained to be separated from the disc 13'.

Figure 11B:
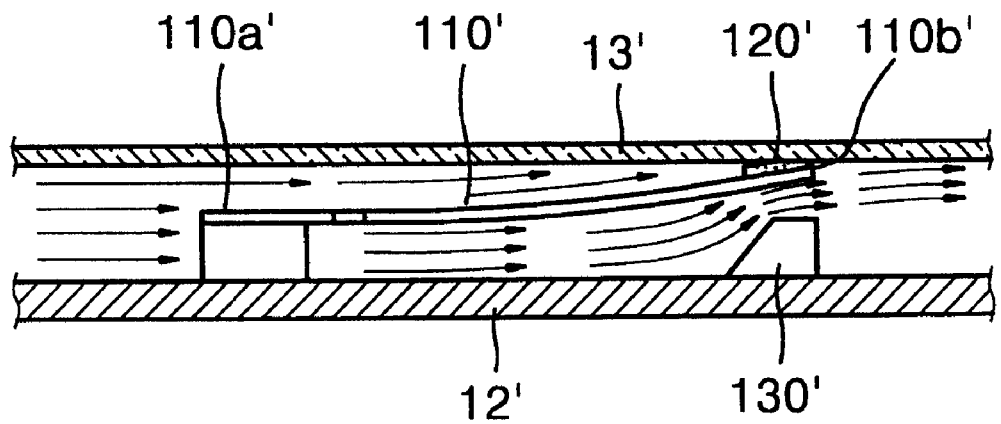

However, when the disc 13' rotates at a high speed above the speed to record and reproduce information, the flow of air generated around the disc 13' moves along the protrusion 130' and presses the other side 110b' of the elastic plate 110' toward the disc 13', so that the filter 120' contacts the disc 131', as shown in FIG. 11B. Then, the filter 120' in contact with the disc 13' rotating at a high speed removes foreign material adhering to the surface of the disc 13'. Thus, like the disc cartridge, by setting a speed at which the flow of air generated enables the filter 120' to contact the disc 13' in a cleaning mode, cleaning can be performed by the flow of air without an additional operation by the user.

Likewise, the disc cartridges according to the second and third embodiments described in FIGS. 8A and 8B, and 9A and 9B can be applied to the disc recording and reproducing apparatus of the present invention. That is, by installing the elastic plates 210 and 310 at the housing 12' of the disc recording and reproducing apparatus instead of the case 12, the same effect as in the disc cartridges according to the above-described embodiments can be obtained.

Thus, the cleaning unit having various structures as described in the above disc cartridges can be applied to the housing 12' of the disc recording and reproducing apparatus. Accordingly, foreign material adhering to the surface of the disc 13' can be removed by using only the flow of air without an additional operation by the user. The cleaning unit maybe symmetrically installed at both sides of the disc 13'.

As a result, when the cleaning unit is installed at the inner bottom surface of a main body encompassing the disc (i.e., the disc cartridge or the housing of the disc recording and reproducing apparatus), the cleaning unit is operated by the flow of air and the difference in air pressure according to the rotation of the disc so that foreign material adhering to the surface of the disc can be removed.

As described above, in the disc cartridge and the disc recording and reproducing apparatus according to the present invention, since the cleaning unit, which closely contacts or is separated from the surface of the disc while being elastically moved due to the flow of air, is installed in the case or housing facing the disc, foreign material adhering to the surface of the disc can be removed without an additional operation by the user. Also, since the cleaning unit does not escape from a disc area, the disc cartridge or the disc recording and reproducing apparatus is compact.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A disc cartridge including a disc to record and reproduce information and a case to accommodate the disc, the disc cartridge comprising:

a cleaning unit installed inside the case and selectively contacting or being separated from the disc depending on a flow of air generated during a rotation of the disc, the cleaning unit removing foreign material adhering to a surface of the disc when contacting the disc.

2. The disc cartridge as claimed in claim 1, wherein the cleaning unit comprises:

an elastic plate having a first end fixed to an inner bottom surface of the case and a second end moving between the disc and the inner bottom surface of the case by being elastically deformed depending on the flow of the air generated during the rotation of the disc; and a filter installed at the second end of the elastic plate to perform cleaning by contacting the disc when the second end of the elastic plate is moved toward the disc.

3. The disc cartridge as claimed in claim 2, wherein a protrusion protruding toward the second end of the elastic plate is provided at the inner bottom surface of the case and the second end of the elastic plate is elastically biased in a direction of being separated from the disc, so that, when the disc rotates at a speed which is equal to or less then a speed to record and reproduce the information, the elastic plate maintains a state of being separated from the disc and, when the disc rotates at a speed greater than the speed to record and reproduce the information, the flow of the air generated during the rotation of the disc moves along the protrusion and presses the second end of the elastic plate toward the disc.

4. The disc cartridge as claimed in claim 2, wherein the elastic plate is elastically biased in a direction in which the filter is in contact with the disc, so that, when the disc rotates at a speed less than a speed to record and reproduce the information, the elastic plate performs cleaning by being in contact with the disc and, when the disc rotates at the speed to record and reproduce the information, the second end of the elastic plate is separated from the disc.

5. The disc cartridge as claimed in claim 2, wherein the elastic plate operates in a direction in which the second end of the elastic plate contacts the disc while the flow of the air generated during the rotation of the disc flows from the second end of the elastic plate to the first end of the elastic plate, so that, when the disc rotates at a speed which is equal to or less than a speed to record and reproduce the information, the second end of the elastic plate maintains a state of being-separated from the disc and, when the disc rotates at a speed greater than the speed to record and reproduce the information, the flow of the air generated during the rotation of the disc overcomes an elastic force of the elastic plate and presses the second end of the elastic plate toward the disc.

6. A disc recording and reproducing apparatus to record or reproduce information to and from a disc rotating inside a housing, the apparatus comprising:

a cleaning unit installed inside the housing and selectively contacting or being separated from the disc depending on a flow of air generated during a rotation of the disc, so that the cleaning unit removes foreign material adhering to a surface of the disc when contacting the disc.

7. The apparatus as claimed in claim 6, wherein the cleaning unit comprises:

an elastic plate having a first end fixed to an inner bottom surface of the housing and a second end moving between the disc and the inner bottom surface of the housing by being elastically deformed depending on the flow of the air generated during the rotation of the disc; and a filter installed at the second end of the elastic plate to perform cleaning by contacting the rotating disc when the second end of the elastic plate is moved toward the disc.

8. The apparatus as claimed in claim 7, wherein a protrusion protruding toward the second end of the elastic plate is provided at the inner bottom surface of the housing and the second end of the elastic plate is elastically biased in a direction of being separated from the disc, so that, when the disc rotates at a speed which is equal to or less than a speed to record and reproduce the information, the elastic plate maintains a state of being separated from the disc and, when the disc rotates at a speed greater than the speed to record and reproduce, the flow of the air generated during the rotation of the disc moves along the protrusion and presses the second end of the elastic plate toward the disc.

9. The apparatus as claimed in claim 7, wherein the elastic plate is elastically biased in a direction in which the filter is in contact with the disc, so that, when the disc rotates at a speed less than a speed to record and reproduce the information, the elastic plate performs cleaning by being in contact with the disc and, when the disc rotates at the speed to record and reproduce the information, the second end of the elastic plate is separated from the disc.

10. The apparatus as claimed in claim 7, wherein the elastic plate operates in a direction in which the second end of the elastic plate contacts the disc while the flow of the air generated during the rotation of the disc flows from the second end of the elastic plate to the first end of the elastic plate, so that, when the disc rotates at a speed which is equal to or less than a speed to record and reproduce the information, the second end of the elastic plate maintains a state of being separated from the disc and, when the disc rotates at a speed greater than the speed to record and reproduce the information, the flow of the air generated during the rotation of the disc overcomes an elastic force of the elastic plate and presses the second end of the elastic plate toward the disc.

11. A disc cartridge to accommodate a disc to record and reproduce information, the disc cartridge comprising:
   a case; and
   a cleaning unit installed inside the case, the cleaning unit selectively contacting or being separated from the disc depending on a flow of air generated during a rotation of the disc, the cleaning unit removing foreign material from a surface of the disc when contacting the disc.

12. The disc cartridge as claimed in claim 11, wherein the cleaning unit comprises:
   an elastic plate having a first end fixed to the case and a second end contacting or being separated from the disc by being elastically deformed depending on the flow of the air generated during the rotation of the disc; and
   a filter installed at the second end of the elastic plate to contact and clean the disc.

13. The disc cartridge as claimed in claim 12, wherein the second end of the elastic plate is elastically biased to separate the filter from the disc.

14. The disc cartridge as claimed in claim 12, wherein the second end of the elastic plate is biased so that the filter contacts the disc.

15. The disc cartridge as claimed in claim 13, wherein the filter is separated from the disc when the disc rotates at a speed which is equal to or less then a speed to record and reproduce the information to/from the disc, and the filter contacts the disc when the disc rotates at a speed greater than the speed to record and reproduce the information to/from the disc due to a force generated by the flow of the air.

16. The disc cartridge as claimed in claim 14, wherein the filter contacts the elastic plate when the disc rotates at a speed which is less then a speed to record and reproduce the information to/from the disc, and the filter is separated from the disc when the disc rotates at a speed greater than the speed to record and reproduce the information to/from the disc.

17. The disc cartridge as claimed in claim 15, wherein the flow of the air generated by the rotation of the disc flows from the first end to the second end of the elastic plate.

18. The disc cartridge as claimed in claim 15, wherein the flow of the air generated by the rotation of the disc flows from the second end to the first end of the elastic plate.

19. The disc cartridge as claimed in claim 12, wherein the filter selectively contacts or is separated from the disc by a force generated by a difference between an air pressure next to the disc and an air pressure next to the second end of the elastic plate.

20. The disc cartridge as claimed in claim 11, wherein the cleaning unit does not escape from a disc area.

21. A recording and/or reproducing apparatus comprising:
   a disc to record and reproduce information;
   a case; and
   a cleaning unit installed inside the case, the cleaning unit selectively contacting or being separated from the disc depending on a flow of air generated during a rotation of the disc, the cleaning unit removing foreign material from a surface of the disc when contacting the disc.

22. The recording and/or reproducing apparatus as claimed in claim 21, wherein the cleaning unit comprises:
   an elastic plate having a first end fixed to the case and a second end contacting or being separated from the disc by being elastically deformed depending on the flow of the air generated during the rotation of the disc; and
   a filter installed at the second end of the elastic plate to contact and clean the disc.

23. The recording and/or reproducing apparatus as claimed in claim 22, wherein the second end of the elastic plate is elastically biased to separate the filter from the disc.

24. The recording and/or reproducing apparatus as claimed in claim 22, wherein the second end of the elastic plate is biased so that the filter contacts the disc.

25. The recording and/or reproducing apparatus as claimed in claim 23, wherein the filter is separated from the disc when the disc rotates at a speed which is equal to or less then a speed to record and reproduce the information to/from the disc, and the filter contacts the disc when the disc rotates at a speed greater than the speed to record and reproduce the information to/from the disc due to a force generated by the flow of the air.

26. The recording and/or reproducing apparatus as claimed in claim 24, wherein the filter contacts the elastic plate when the disc rotates at a speed which is less then a speed to record and reproduce the information to/from the disc, and the filter is separated from the disc when the disc rotates at a speed greater than the speed to record and reproduce the information to/from the disc.

27. The recording and/or reproducing apparatus as claimed in claim 25, wherein the flow of the air generated by the rotation of the disc flows from the first end to the second end of the elastic plate.

28. The recording and/or reproducing apparatus as claimed in claim 25, wherein the flow of the air generated by the rotation of the disc flows from the second end to the first end of the elastic plate.

29. The recording and/or reproducing apparatus as claimed in claim 22, wherein the cleaning unit further comprises a notch disposed between the first and second ends of the elastic plate.

30. The recording and/or reproducing apparatus as claimed in claim 29, wherein the notch is formed by reducing a width of the elastic plate.

31. The recording and/or reproducing apparatus as claimed in claim 27, wherein the notch is formed by reducing a thickness of the elastic plate.

* * * * *